United States Patent [19]
Sorbara et al.

[11] Patent Number: 5,947,260
[45] Date of Patent: Sep. 7, 1999

[54] DEVICE FOR LUBRICATING CONVEYOR CHAINS, CHAINS FOR DRIVES, AND THE LIKE

[76] Inventors: Giuseppe Sorbara, Via Idice, 20, 40068 S. Lazzaro di Savena; Umberto Comoglio, Via Vezzolano, 21, 10153 Torino, both of Italy

[21] Appl. No.: 08/985,290

[22] Filed: Dec. 4, 1997

[51] Int. Cl.$^6$ .................................................. B65G 45/08
[52] U.S. Cl. ........................... 198/500; 184/12; 184/15.2; 184/17
[58] Field of Search ............................... 198/500; 184/12, 184/15.1, 15.2, 17

[56] References Cited

U.S. PATENT DOCUMENTS 3,672,468  6/1972  Schuster .
4,024,930  5/1977  Thomson .

FOREIGN PATENT DOCUMENTS 2 311 970  12/1976  France .

*Primary Examiner*—William E. Terrell
*Assistant Examiner*—Mark Deuble
*Attorney, Agent, or Firm*—Guido Modiano; Albert Josif

[57] ABSTRACT

A device for lubricating chains, having a sprocket (4) which is fixed to a rotating shaft (6) with an axis of rotation which lies transversely to the chain (1) to be lubricated and is suitable to mesh with the chain. A pair of sidewalls (17,18) are attached to the respective sides of the sprocket, and the device is provided with a box-shaped support (13) for the sprocket and for the sidewalls. Holes (27) are provided which lead out at the peripheral region of the sidewalls to release a lubricant onto the chain. Distribution holes (25,26) disposed in the sidewalls in communication with the peripheral holes (27) of the sidewalls receive lubricant delivered though an axial hole (28) arranged in the rotating shaft.

2 Claims, 5 Drawing Sheets

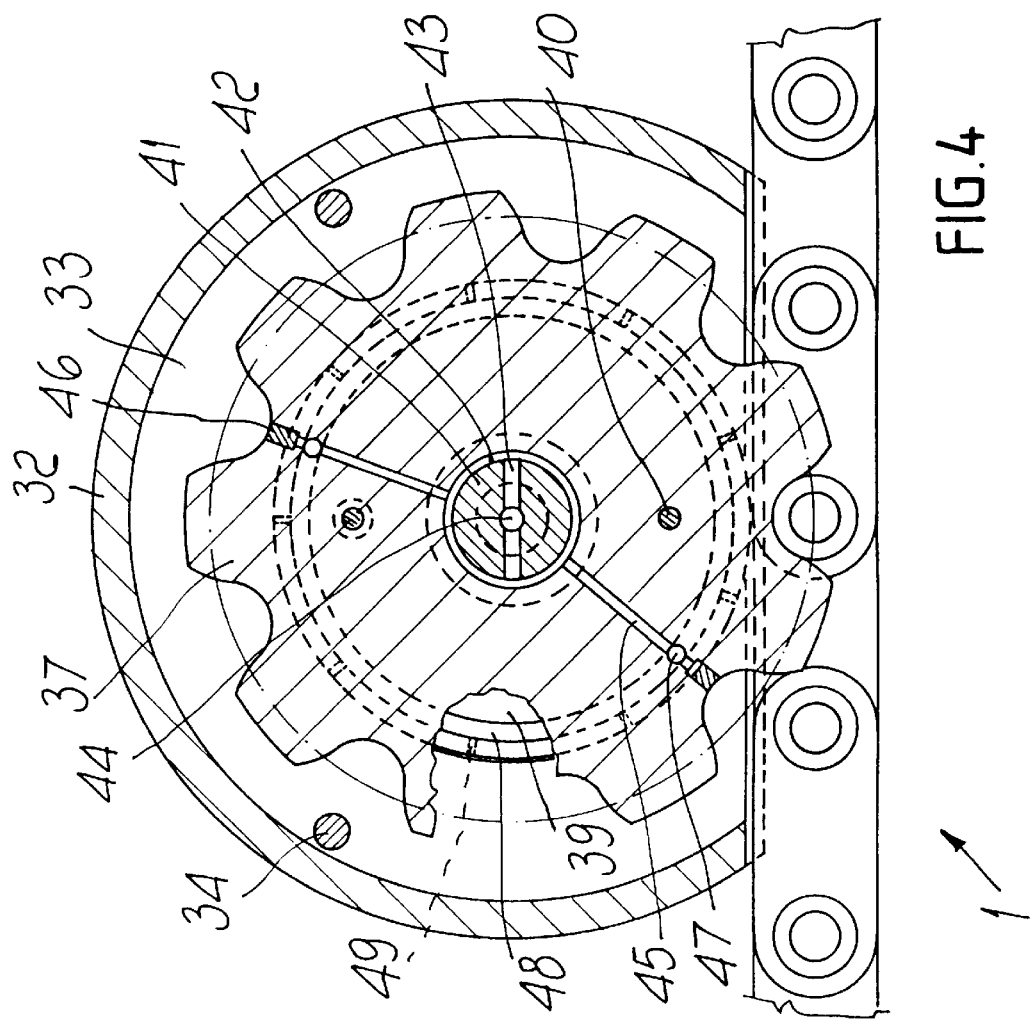
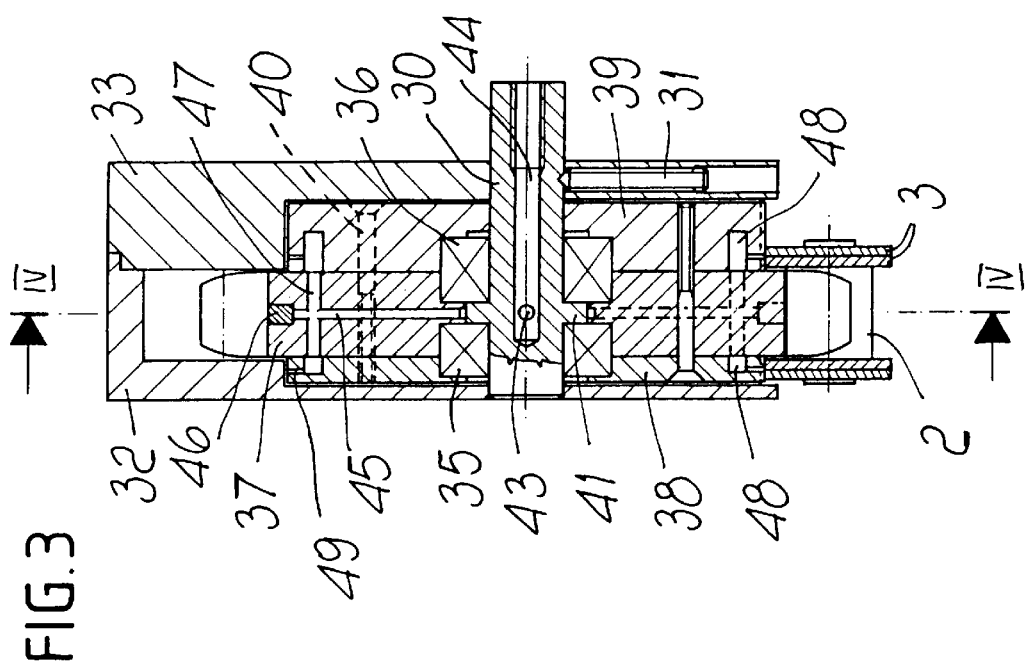
FIG.3
FIG.4

6,947,260

DEVICE FOR LUBRICATING CONVEYOR CHAINS, CHAINS FOR DRIVES, AND THE LIKE

BACKGROUND OF THE INVENTION

The present invention relates to a device for lubricating conveyor chains, chains for drives, and the like.

Conventional conveyors are currently in widespread use which are actuated by chains. In particular, chains constituted by rollers articulated by means of pairs of link plates are used in this field.

Rollers soaked in a suitable lubricant are commonly used to lubricate these chains; as an alternative, the lubricant is applied by means of brushes and the like.

This solution, in addition to being scarcely suited to the automation requirements of current conveyors, entails a considerable waste of lubricant, since it is not possible to precisely meter the necessary amount thereof. Accordingly, there is a tendency to supply too much lubricant, leading to an undesirable dripping thereof.

The fact is also noted that in some fields of commerce technology, such as food products, an excess of oil and the consequent dripping can damage the products being conveyed.

SUMMARY OF THE INVENTION

A principal aim of the present invention is to solve the above problem by providing a device which allows to automatically lubricate conveyor chains, chains for drives, and the like, and to precisely control the dosage of the lubricant and the location of the lubricated regions.

Within the scope of this aim, an object of the present invention is to provide a device for lubricating said chains which is simple in concept, extensively uses commercially available components, has a very low cost, and is safely reliable in operation and versatile in use.

This aim and this object are achieved by the present device for lubricating conveyor chains, chains for drives, and the like, which is characterized in that it comprises: a sprocket which is rotatably supported about an axis which lies transversely to the chain to be lubricated and is suitable to mesh with said chain; a pair of sidewalls located on the respective sides of said sprocket; a substantially box-shaped support for the sprocket and for the sidewalls; holes which lead out at the peripheral region of said sidewalls to release a lubricant onto said chain; means which are suitable to distribute said lubricant to said holes and are connected to said sprocket; and means for the controlled delivery of the lubricant to said distribution means which are connected to the sprocket.

BRIEF DESCRIPTION OF THE DRAWINGS

Further characteristics and advantages of the invention will become apparent from the following detailed description of preferred embodiments of the device for lubricating conveyor chains and the like, illustrated only by way of non-limitative example in the accompanying drawings, wherein:

FIG. 3 is a transverse vertical sectional view of the device according to the invention, in a second embodiment;

FIG. 4 is a longitudinal vertical sectional view thereof, taken along the plane IV—IV of FIG. 3;

FIG. 5 is a transverse vertical sectional view of the device according to the invention, in a third and fourth embodiments thereof, of which

DESCRIPTION OF THE PREFERRED EMBODIMENTS

Figure 1:
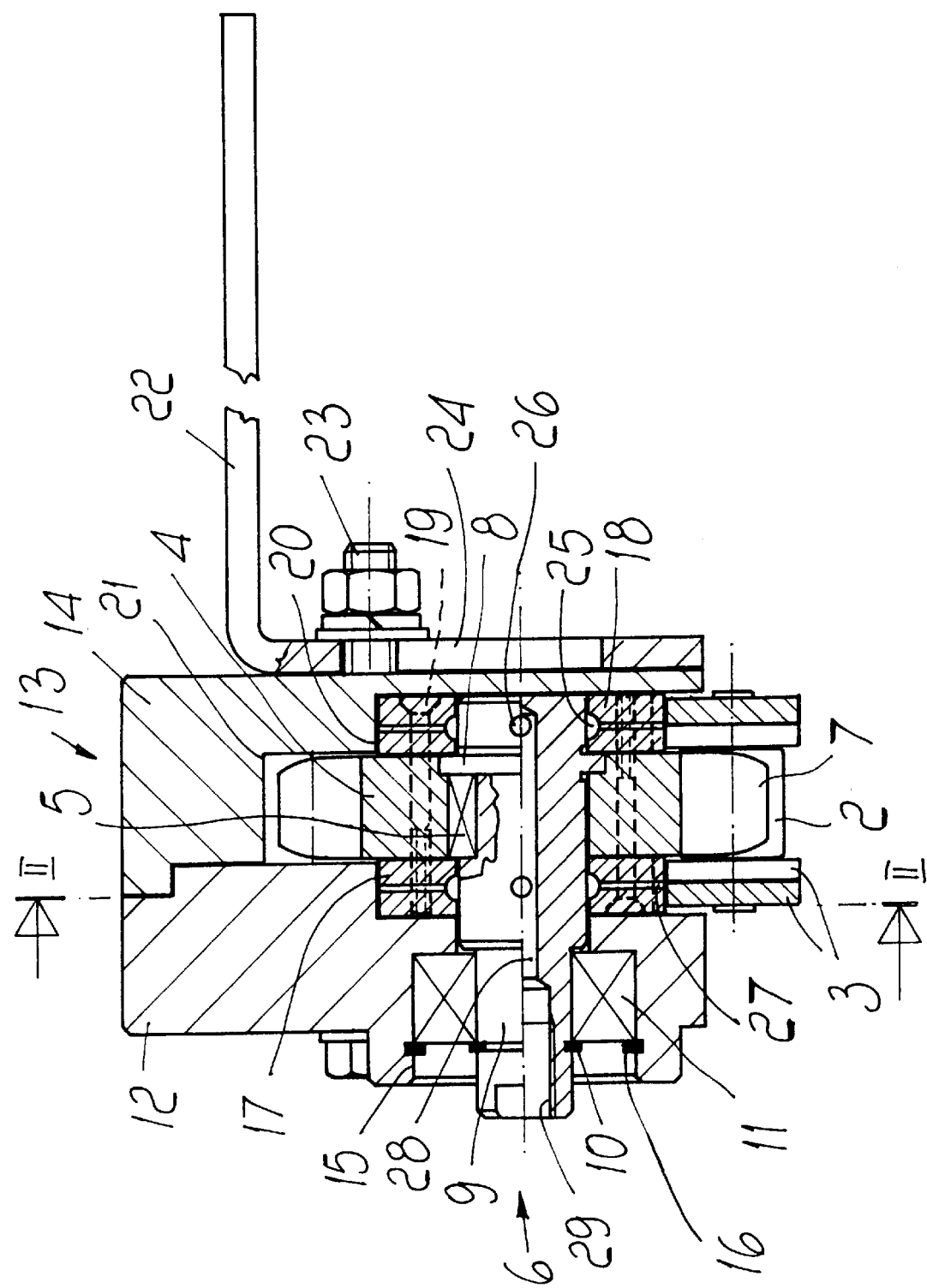
FIG. 1 is a transverse vertical sectional view of the device according to the present invention, in a first embodiment.
Figure 2:
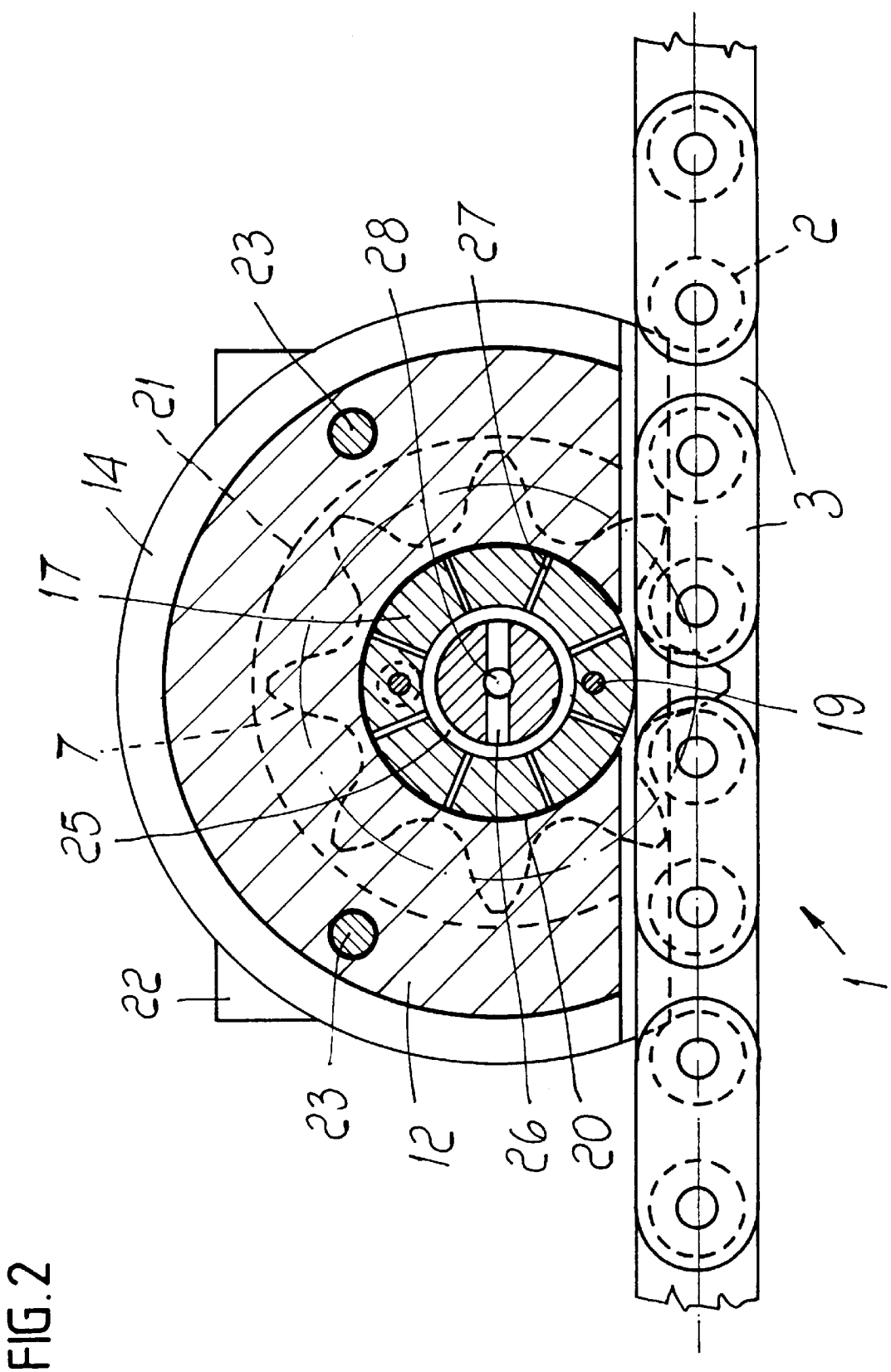
FIG. 2 is a longitudinal vertical sectional view thereof, taken along the plane II—II of FIG. 1.

Initially with particular reference to FIGS. 1 and 2, the reference numeral 1 designates a chain for conveyors, drives and the like which is meant to be lubricated by the lubrication device according to the present invention. In particular, the chain 1 is of the type with rollers 2 which are mutually articulated by means of pairs of link plates 3.

The device has a sprocket 4 which, by means of a key 5, is keyed on the central portion of a horizontal shaft 6, which is arranged transversely to the chain 1 to be lubricated. The sprocket 4 has an even number of teeth 7 and meshes with the chain 1.

Proximate to one of its ends, the shaft 6 has a short expansion 8 accommodated in a front recess of the sprocket 4.

At its other end and proximate thereto, the shaft 6 has a portion 9 which has a reduced diameter, so that between portion 9 and the central portion there is provided a shoulder; between the shoulder and an elastic ring 10, which engages the portion 9, there is provided a bearing 11 whereby the shaft 6 is rotatably mounted on a half-shell 12 of a box 13 which is also constituted by the half-shell 14.

The shaft 6 passes through the half-shell 12 with part of its central portion and of its portion 9, which protrudes from the half-shell; the corresponding through hole of the half-shell 12 widens outward at 15 in order to accommodate the bearing 11, which remains interposed between the bottom of the wider region 15 and an elastic ring 16 which engages the wider region.

To the sides of the sprocket 4 there are provided respective annular sidewalls 17 and 18, which are rigidly coupled thereto by means of screws 19 and have a smaller outside diameter than said sprocket. The sidewalls lie above the link plates 3 of the chain 1: their downward edge slightly protrudes from the respective seats 20 of the half-shells 12 and 14; the remaining parts of the seats adhere to the sidewalls and surround them.

The half-shell 14 also forms the seat 21 for the sprocket 4, which protrudes downward from it. The joint between the two half-shells 12 and 14 is at a plane which is parallel to the sprocket 4 and to the sidewalls 17 and 18 and has the seats 20 on opposite sides.

The two half-shells are clamped to each other and to a bracket 22 for supporting the lubrication device by means of bolts 23: for adjusting the vertical elevation of the device, the bolts engage the bracket at slots 24 thereof which are vertically elongated.

Each sidewall is inserted on the shaft 6 and is internally provided with an annular groove 25 into which at least one respective hole 26 leads; hole 26 passes diametrically through the shaft 6. Holes 27 are connected to the groove 25, pass radially through the sidewall, and are uniformly angularly distributed therein so as to match the gaps between the teeth 7 of the sprocket 4.

The holes 26 are connected to a hole 28 which is arranged axially with respect to the shaft 6 and has, at the portion 9 of said shaft, a threaded inlet 29 for the connection of a rotary coupling, not shown.

A pump, not shown, is connected to said coupling and delivers the lubricant at the intended pressure and flow-rate.

Operation of the described device is therefore as follows.

By meshing with the chain 1, the sprocket 4, whilst the segment of the chain advances, is turned by the chain even at high speeds and turns the sidewalls 17 and 18, which are rigidly coupled thereto.

In the device of FIGS. 3 and 4, according to a second embodiment, a shaft 30 is rigidly coupled, by means of a grub screw 31, to the half-shells 32 and 33, which are clamped to each other and to a bracket by means of bolts 34.

By means of the pair of bearings 35 and 36, the sprocket 37 is fitted on the shaft 30 so that it can rotate together with the pair of respective sidewalls 38 and 39, which are rigidly coupled thereto by means of screws 40. The bearings are located in the corresponding faces, partly in those of the sidewalls and partly in those of the sprocket, remaining on either side of a short expansion 41 of the shaft 30.

The sprocket 37, at the expansion 41, is internally provided with an annular groove 42 into which a respective hole 43 leads, the hole passing diametrically through the expansion 41 of the shaft 30.

The hole 43 is connected to a hole 44 which lies axially with respect to the shaft 6 and has, for connection to a lubricant delivery pump, a threaded inlet at one end of the shaft which protrudes from the half-shell 33. Holes 45 are connected to the groove 42 and run radially with respect to the sprocket 37 without exiting in the peripheral region thereof, where they are closed by suitable plugs 46. Each hole 45 is instead connected to a respective hole 47 which passes through the thickness of the sprocket.

The holes 47 also lead into annular grooves 48 which are arranged frontally with respect to the sidewalls 38 and 39; holes 49 are connected to the grooves 48 and run radially with respect to the sidewalls, exiting in their peripheral region at the link plates 3 of the chain 1; the angular distribution of the holes in the sidewalls is uniform and corresponding to the gaps between the teeth of the sprocket 37.

Figure 5:
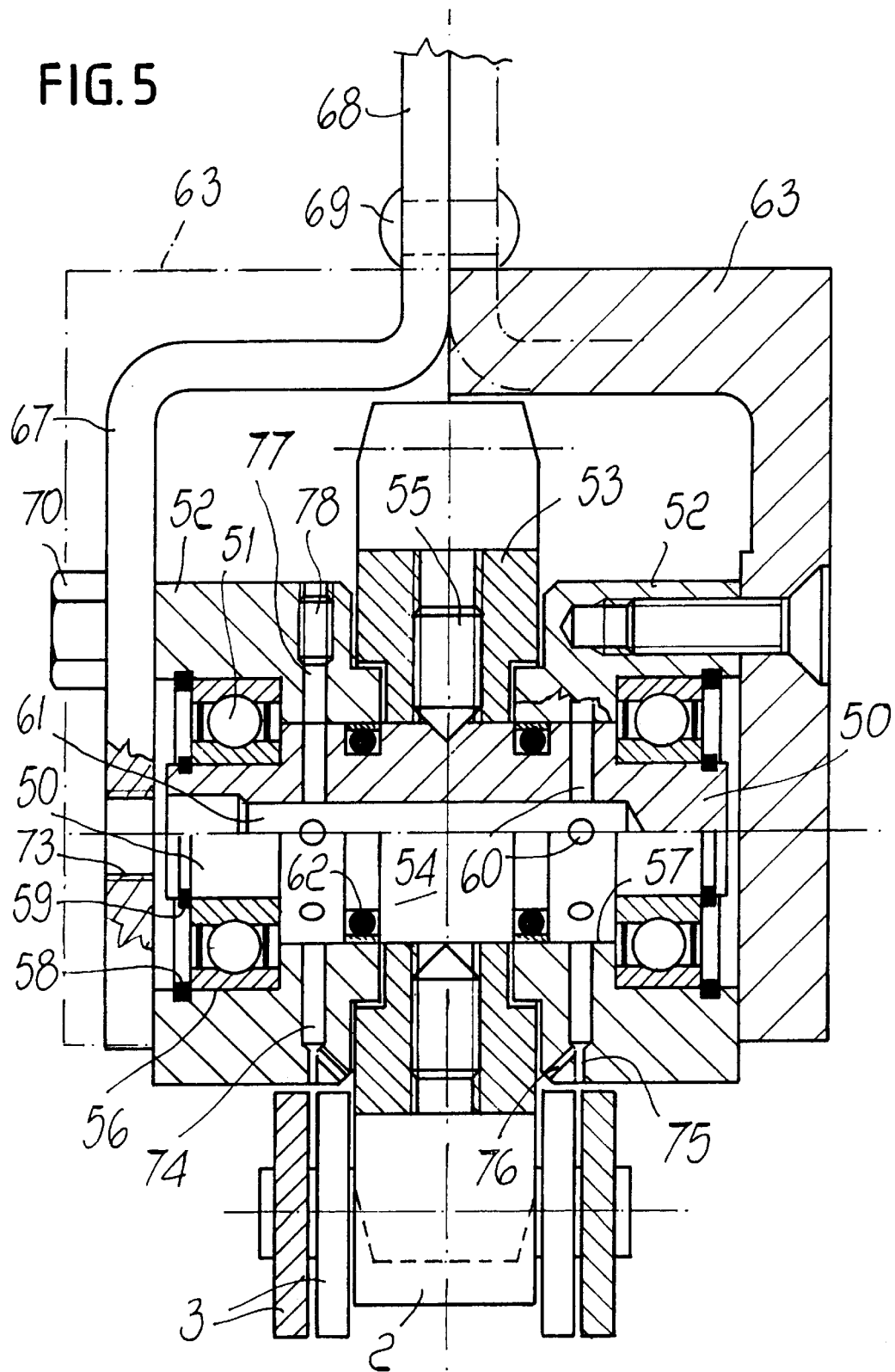
Figure 7:
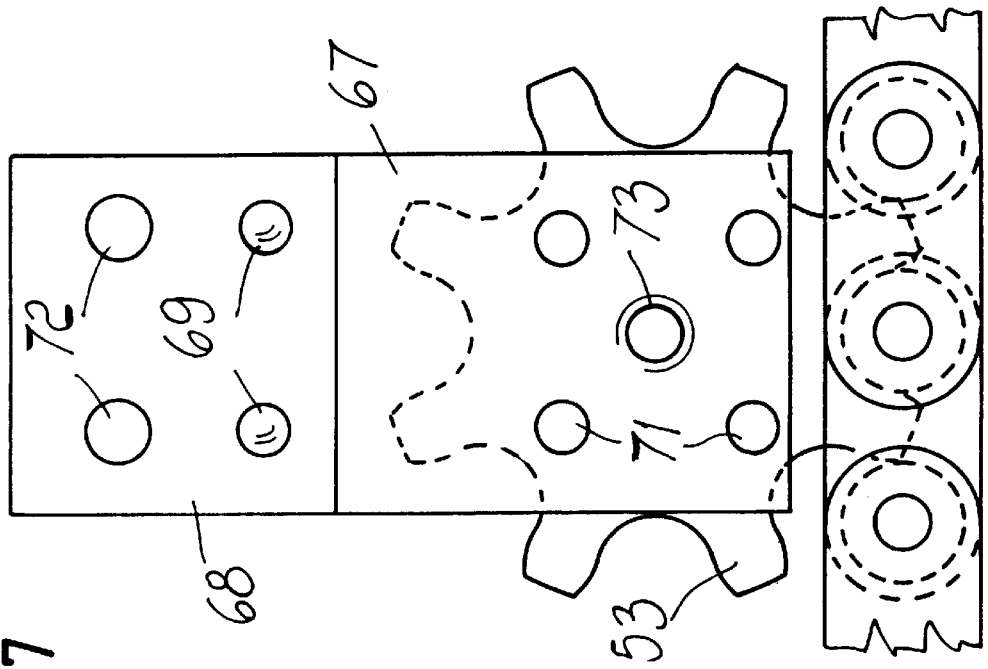
FIGS. 6 and 7 are the respective front views.
Figure 6:
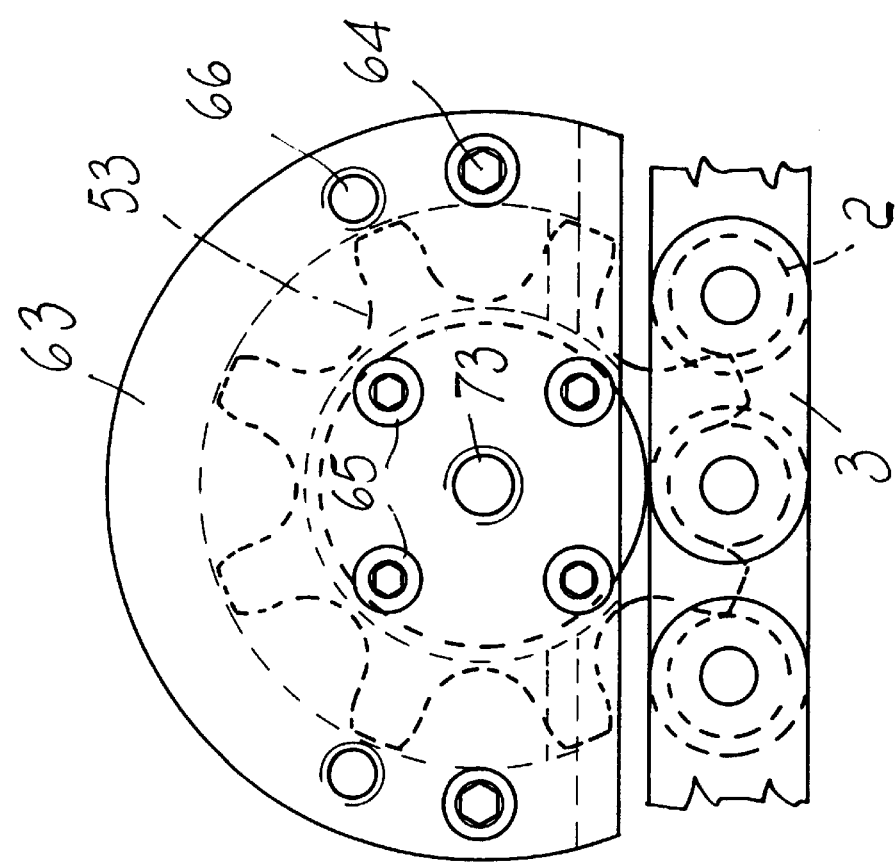

In the device of FIGS. 5, 6 and 7 according to the third and fourth embodiments, the reduced-diameter ends 50 of a shaft are rotatably mounted, by means of the bearings 51, in respective sidewalls 52 between which there is provided a sprocket 53 which is fixed to the center of the remaining portion 54 of the shaft by means of pins 55.

Each bearing 53 is in the external wider portion 56 of a hole which passes through the corresponding sidewall 52 and is also constituted by the internal portion 57; the bearing is retained axially in the portion 56 and remains interposed between an elastic ring 58, which engages the portion 56, and the shoulder formed between the portions 56 and 57; the bearing also remains interposed between an elastic ring 59, which engages the respective end of the shaft 50–54, and the respective shoulder formed between 50 and 54, which corresponds to the shoulder between 56 and 57.

Proximate to said two shoulders, the portion 54 of the shaft is provided with a respective set of radial holes 60 which are uniformly angularly distributed so that there is one for each gap of the sprocket 53; the holes 60 of both sets are connected to a hole 61 which runs axially with respect to the shaft 50–54 and is open at one end thereof. Sealing gaskets 62 are interposed between the portions 57 and the portion 54 of the shaft and are accommodated in respective grooves thereof which are arranged proximate to the faces of the sprocket 53.

As shown in FIG. 6 and in the right portion of FIG. 5, the sidewalls 52 are rigidly coupled to, and arranged inside, respective half-shells 63 of a box which is open in a downward region, so that the sprocket 53 protrudes from it and the lower edge of said sidewalls lies above the link plates 3 of the chain 1 (in the left part of FIG. 5, the dot-and-dash lines indicate the bulk of the corresponding half-shell). Screw elements 64 and 65 respectively clamp the half-shells to each other and to the respective sidewalls. The half-shells, by adhering to the sidewalls in a frontal position, close their perforated portion 56. The box formed by the two half-shells 63 is fixed where necessary by screw means, which couple to the threaded holes 66 provided in one of said half-shells.

More simply and conveniently (see FIG. 7 and the left portion of FIG. 5), the sidewalls 52 are rigidly coupled to, and arranged inside, respective arms 67 of a fork instead of half-shells 63; in the fork, the regions 68 where said arms extend upwards (the region of the left portion of 5 is partly shown in dot-and-dash lines) merge and are mutually clamped by rivets or welds 69. Screw elements 70, which pass through holes 71 of the arms 67, rigidly couple the sidewalls 52 to said arms; the holes 72 of the portions 68 are for the screw elements which fix the fork 67–68 where necessary.

In front of the open end of the hole 61, the respective half-shell 63 or arm 67 is crossed by a threaded hole 73 for connection to a lubricant delivery pump.

Therefore, as one hole 60 moves downwards, the lubricant that arrives from said pump is released onto the link plates 3 of the chain from the outlet of a hole 74 of the respective sidewall 52 in front of which the hole 60 is arranged: the outlet is limited to the passage 75 if the link plates 3 have a modest thickness; in the case of thick link plates, as in FIG. 5, the outlet also includes the passage 76.

The practical execution, in a sidewall, of the hole 74 with the corresponding outlet arranged downward entails that the hole is the continuation of an upper hole 77 which is then closed by a suitable plug 78 at the top of the sidewall.

Depending on the space available in the various applications of the device, the sidewalls may have (FIGS. 1 and 5) or not have (FIG. 3) symmetrical configurations with respect to the sprocket.

Attention is called to the fact that the intended placement of the lubricated regions is controlled precisely in all three of the illustrated embodiments. Both in the case of the rotating sidewalls of the first two embodiments and in the case of the fixed sidewalls of the third embodiment, the lubricant always arrives at the outlet of the holes 27 or 49 or 74 of the sidewalls from distribution means which are connected to the sprocket that meshes with the chain.

In the practical embodiment of the invention, the materials employed, as well as the shapes and the dimensions, may be any according to requirements.

What is claimed is:

1. A device for lubricating conveyor chains, chains for drives, and the like, comprising: a sprocket which is rotatably supported about an axis which lies transversely to the chain to be lubricated and is suitable to mesh with said chain; a pair of sidewalls located on the respective sides of said sprocket; a substantially box-shaped support for the sprocket and for the sidewalls; holes which lead out at the peripheral region of said sidewalls to release a lubricant onto said chain; means which are suitable to distribute said lubricant to said holes and are connected to said sprocket; means for the controlled delivery of the lubricant to said distribution means which are connected to the sprocket; a shaft to which said sprocket is fixed; a box-shaped support for rotatably supporting said shaft, said sidewalls being arranged internally of said box-shaped support and being fixed to said sprocket about said shaft such that said sidewalls rotate together with said shaft and said sprocket about said axis extending transversely to the chain to be lubricated, said shaft having an axial hole for connection through said box-shaped support to a lubricant delivery pump, and said shaft having diametric holes which are connected to said axial hole and are connected one by one to radial holes which exit peripherally in each sidewall, said radial holes being angularly uniformly distributed so that there is one for each gap between the teeth of said sprocket.

2. A device according to claim 1, wherein said shaft, which is rotatably supported by said box-shaped support about said transverse axis, has said sprocket keyed thereto, said sidewalls being rigidly fitted on said sprocket about said shaft, said shaft being axially provided with said axial hole which, by means of a rotary coupling, is connected to a lubricant delivery pump and is then connected, through said diametric holes arranged diametrically to said shaft, to respective annular grooves which are arranged inside said sidewalls and are in turn connected to said radial holes which exit at the peripheral region of said sidewalls and are radial thereto, said radial holes being angularly uniformly distributed so that there is one for each gap between the teeth of said sprocket, said box-shaped support being constituted by two half-shells which substantially surround said sidewalls so that they adhere thereto, allowing only the downward edge to protrude slightly.

* * * * *